United States Patent
Shin et al.

(10) Patent No.: US 7,796,114 B2
(45) Date of Patent: Sep. 14, 2010

(54) LIQUID CRYSTAL DISPLAY APPARATUS AND METHOD OF DRIVING

(75) Inventors: Seong-Sik Shin, Gyeonggi-do (KR); Jong-Seo Lee, Gyeonggi-do (KR); Jung-Suk Han, Seoul (KR); Tae-Jong Jun, Gyeonggi-do (KR); Joo-Young Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 668 days.

(21) Appl. No.: 11/697,999

(22) Filed: Apr. 9, 2007

(65) Prior Publication Data

US 2007/0247560 A1    Oct. 25, 2007

(30) Foreign Application Priority Data

Apr. 25, 2006   (KR) ...................... 10-2006-0036955

(51) Int. Cl.
G09G 3/36   (2006.01)
(52) U.S. Cl. ......................................... 345/102; 349/46
(58) Field of Classification Search .................. 345/82, 345/87, 94, 96, 102, 103; 349/43, 44, 46; 362/561, 612, 613; 438/149
See application file for complete search history.

(56) References Cited

U.S. PATENT DOCUMENTS

| | | | | |
|---|---|---|---|---|
| 6,873,311 | B2 * | 3/2005 | Yoshihara et al. | 345/87 |
| 6,909,412 | B2 * | 6/2005 | Son | 345/87 |
| 7,185,995 | B2 * | 3/2007 | Hatanaka et al. | 362/29 |
| 7,358,942 | B2 * | 4/2008 | Yamazaki et al. | 345/82 |

* cited by examiner

*Primary Examiner*—Abbas I Abdulselam
(74) *Attorney, Agent, or Firm*—Innovation Counsel LLP

(57) ABSTRACT

A liquid crystal display (LCD) apparatus includes an LCD panel and light-emitting units. The light-emitting units generate lights in a corresponding light-emitting interval to illuminate a part of the LCD panel corresponding to the light-emitting units. A light-emitting ending point of the light-emitting interval is disposed between a first maximum light-transmitting time of a first region of the part of the LCD panel and a second maximum light-transmitting time of a second region of the part of the LCD panel, the first region corresponding to the first gate line of gate lines belonging to the part of the LCD panel illuminated by the light-emitting unit and the second region corresponding to the last gate line of the gate lines.

19 Claims, 5 Drawing Sheets

LIQUID CRYSTAL DISPLAY APPARATUS AND METHOD OF DRIVING

CROSS-REFERENCE TO RELATED APPLICATIONS

This application claims priority to Korean Patent Application No. 2006-36955 filed on Apr. 25, 2006, and all the benefits accruing there from under 35 U.S.C. §119, the contents of which are herein incorporated by reference.

FIELD OF THE INVENTION

The present invention relates to a liquid crystal display (LCD) apparatus capable of displaying a color image by dividing a frame into a plurality of periods in which different colors are displayed.

DESCRIPTION OF THE RELATED ART

Generally, an LCD apparatus includes a plurality of display pixels, each of which has three-colored color filters and uses a source of white light. Unfortunately, this reduces resolution by about one third and the filters reduce light transmittance and the degree of color purity. An alternative approach uses the CFL time-sequence driving method which divides a frame into three successive periods of red, green and blue lights furnished by respective light-emitting units. When each light-emitting unit is driven, gate lines corresponding to each light-emitting unit sequentially drive the liquid crystal, so that the luminance of the LCD apparatus is changed by the driving time of the light-emitting unit. Generally, the light-emitting unit is driven so that the peak of the light-transmittance response waveform of the liquid crystal corresponding to a first gate line corresponds to a light-emitting ending point. However, the above driving time is not an optimized driving time, so that improvement of luminance of the LCD apparatus is limited.

SUMMARY OF THE INVENTION

The present invention provides a liquid crystal display (LCD) apparatus having a plurality of light-emitting units that generate lights in corresponding light-emitting intervals. A light-emitting ending point of the light-emitting interval is disposed between a first maximum light-transmitting time in a region corresponding to the first gate line of gate lines belonging to a part of an LCD panel corresponding to the light-emitting unit and a second maximum light-transmitting time in a region corresponding to the last gate line of the gate lines.

The LCD panel comprises a first substrate including gate lines and data lines, a second substrate facing the first substrate and a liquid crystal disposed between the first and second substrates. The liquid crystal is driven by the potential difference between voltages applied to the first substrate and the second substrate and the light transmittance gradually increases with time from the initial application of driving voltage until the driving voltage is removed.

The light-transmittance response waveform of the liquid crystal is sequentially delayed by a constant predetermined interval from the first gate line to the last gate line. The light-transmittance response waveform corresponding to the first gate line reaches a peak value in a first maximum light-transmitting time and the light-transmittance response waveform corresponding to the last gate line reaches a peak value in a second maximum light-transmitting time. For example, one frame is divided into four periods and the light-emitting unit generates red, green, blue and white lights in respective corresponding periods. The time interval between a light emitting unit reaching its a maximum output and the ending of its light output lies in the range of about 0.15 ms to about 0.17 ms. The light-emitting interval may be determined so that a sum of integral values calculated by integrating light-transmittance response waveforms respectively corresponding to from the first gate line to the last gate line of the part of the LCD panel multiplied by a light-emitting signal of the light-emitting unit for an integral interval of the light-emitting interval is maximized. According to the present invention, the driving time of the liquid crystal and light-emitting time of the light-emitting unit is optimized to maximize the luminance of the LCD apparatus.

BRIEF DESCRIPTION OF THE DRAWINGS

The above and other features and advantages of the present invention will become readily apparent by reference to the following detailed description when considered in conjunction with the accompanying drawings, in which.

DESCRIPTION OF THE EMBODIMENTS

Figure 1:
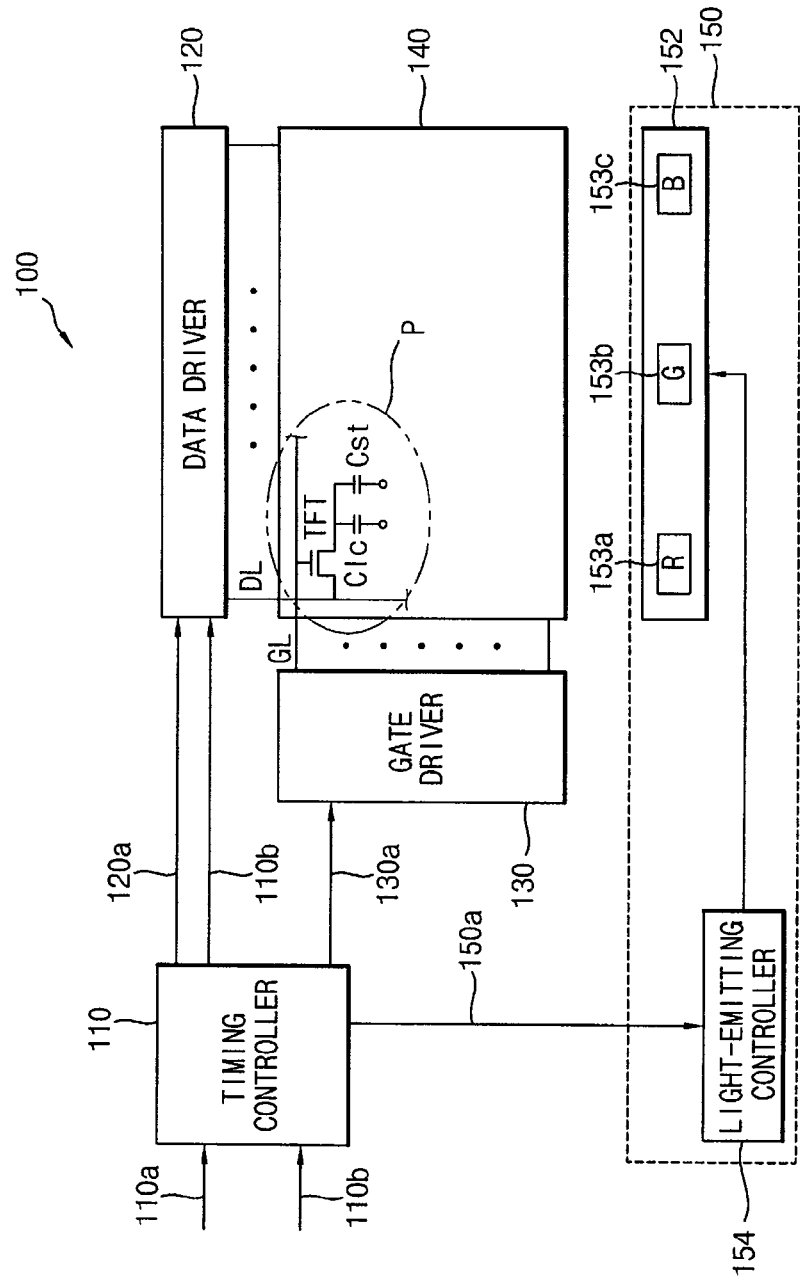
FIG. 1 is a block diagram illustrating a liquid crystal display (LCD) apparatus in accordance with an exemplary embodiment of the present invention.

FIG. 1 is a block diagram illustrating a liquid crystal display (LCD) apparatus in accordance with an exemplary embodiment of the present invention.

Referring to FIG. 1, LCD apparatus 100 includes a timing controller 110, a data driver 120, a gate driver 130, an LCD panel 140 and a backlight unit 150. LCD apparatus 100 displays a color image of a frame by dividing the frame into a plurality of periods in which different colors are displayed, respectively.

Timing controller 110 receives a timing control signal 110a and a data signal 110b from an external device such as a graphic controller, etc. e Timing controller 110 generates and outputs various control signals for driving LCD apparatus 100 in response to the timing control signal 110a. For example, timing controller 110 outputs a data control signal 120a controlling data driver 120, a gate control signal 130a controlling gate driver 130 and a backlight control signal 150a controlling backlight unit 150.

In response to the data control signal 120a provided from timing controller 110, data driver 120 converts the data signal 110a into an analog-typed data voltage and outputs the analog-typed data voltage to LCD panel 140.

In response to the gate control signal 130a provided from timing controller 110, gate driver 130 generates a gate signal and outputs the gate signal to LCD panel 140. A first substrate includes a plurality of gate lines GL and a plurality of data lines DL crossing the gate lines GL. The gate lines GL and the data lines DL define a plurality of pixel areas P. Each pixel area P includes a switching element TFT electrically connected to the gate lines GL and the data lines DL, a liquid crystal capacitor Clc electrically connected to the switching element TFT, and a storage capacitor Cst. A second substrate corresponds to an optically transparent substrate having no color filters formed thereon.

The liquid crystal interposed between the substrates varies the transmittance of light provided from backlight unit 150 which includes light-emitting units 152 disposed under LCD panel 140 and a light-emitting controller 154. The light transmittance of the liquid crystal may increase with the time that the driving voltage is applied.

The light-emitting units 152, for example eight light-emitting units, are disposed along gate lines GL of LCD panel 140. Alternatively, the number of the light-emitting units 152 may be variously changed corresponding to the size of LCD panel 140 and the desired luminance. The light-emitting units 152 are sequentially driven along with the gate lines GL.

Under control of light-emitting controller 154, light-emitting units 152 generate light having a different color corresponding to each period. For example, the light-emitting units 152 sequentially generate red light, green light and blue light in corresponding periods during a single frame.

Figure 2:
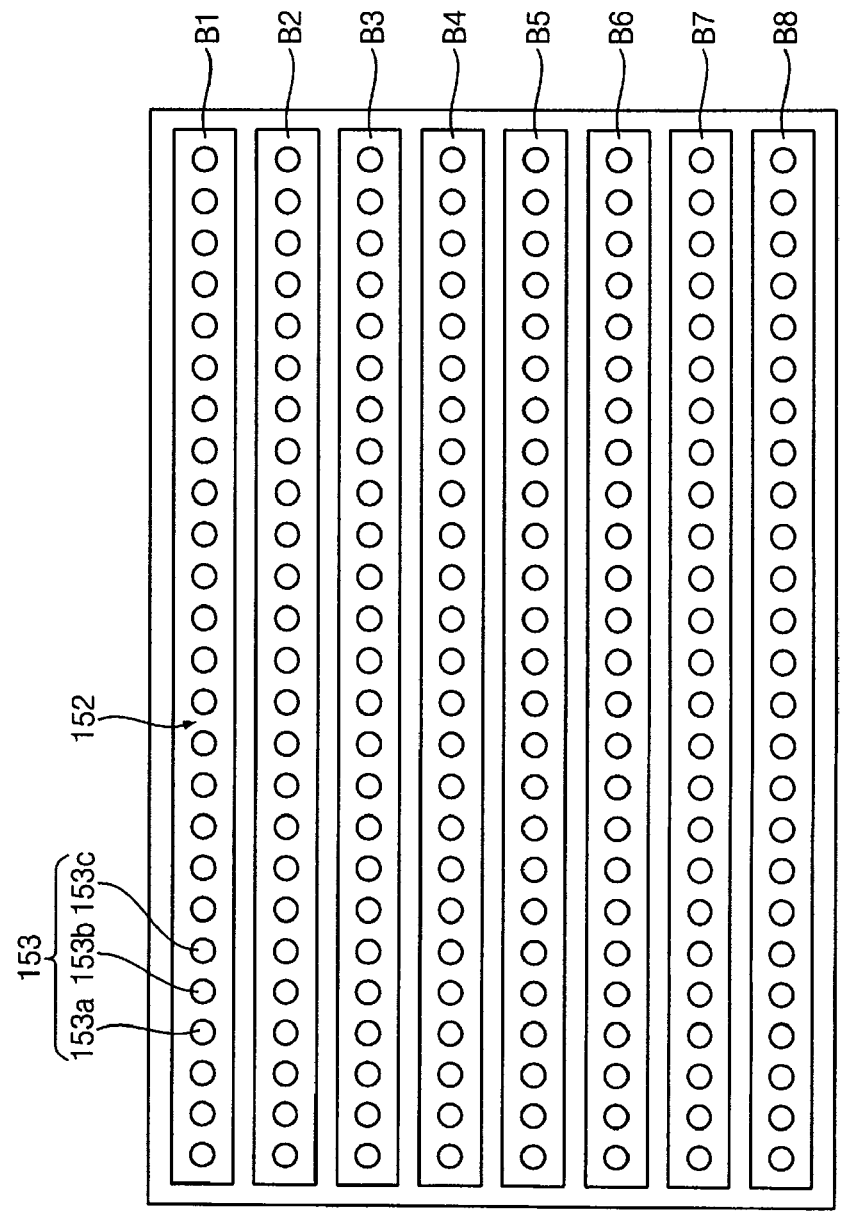
FIG. 2 is a plan view illustrating an arrangement of light-emitting units when the number of the light-emitting units is eight.

FIG. 2 is a plan view illustrating an arrangement of light-emitting units when the number of the light-emitting units is eight.

Referring to FIGS. 1 and 2, the eight light-emitting units 152 are disposed along the gate lines GL such that the light-emitting units 152 are spaced apart from each other by a constant interval.

Each light-emitting unit 152 generates the lights having different colors in corresponding periods during a frame. Each light-emitting unit 152 includes a plurality of light-emitting elements 153. For example, the light-emitting elements 153 include a red light-emitting diode 153a, a green light-emitting diode 153b and a blue light-emitting diode 153c.

Light-emitting unit 152 may generate white light by simultaneously driving red light-emitting diode 153a, green light-emitting diode 153b and blue light-emitting diode 153c. Alternatively, light-emitting unit 152 may further include a white light-emitting diode generating white light. The red light-emitting diode 153a, the green light-emitting diode 153b and the blue light-emitting diode 153c may be arranged in various shapes.

Figure 3:
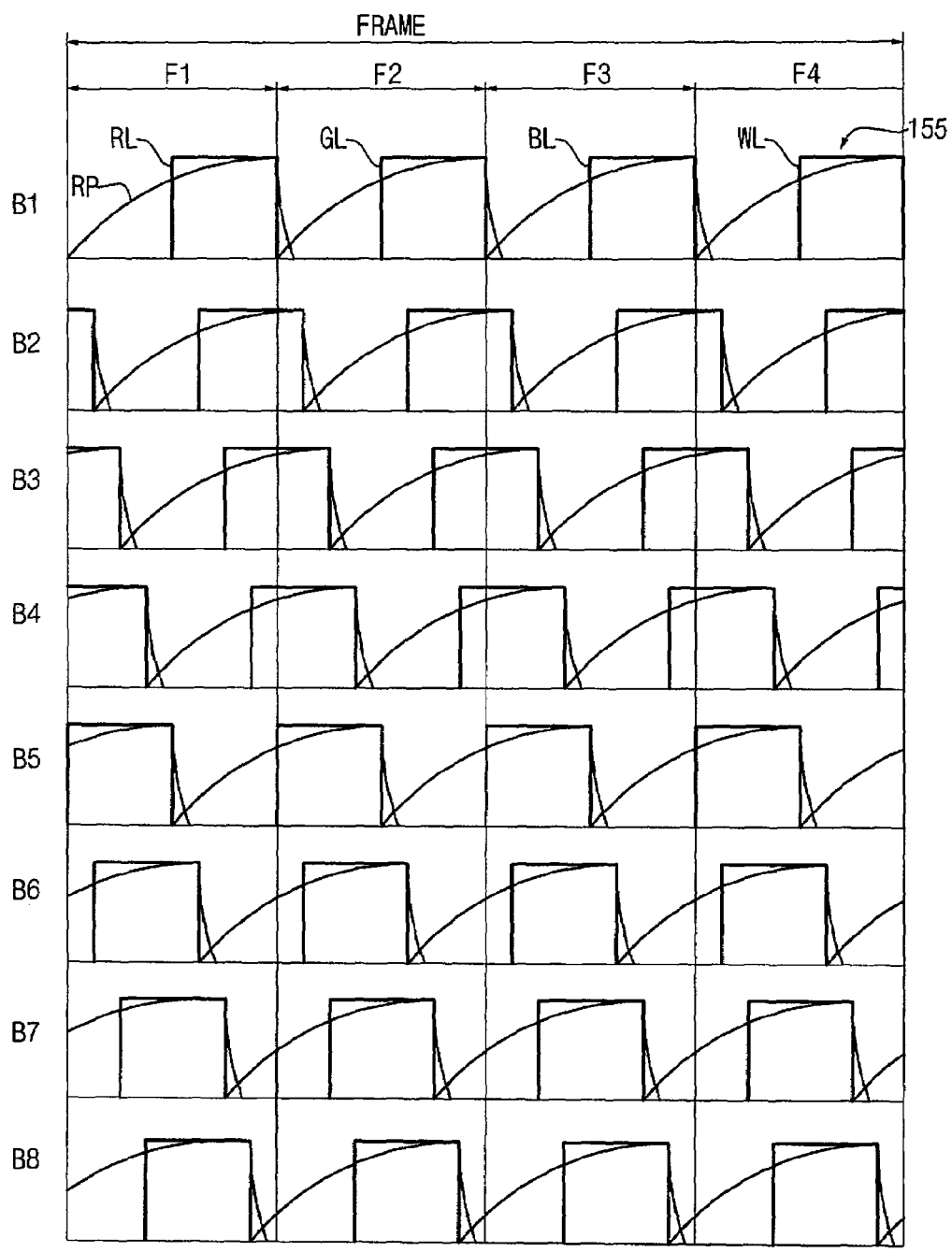
FIG. 3 is a timing chart showing a method of driving the light-emitting unit in FIG. 2.

FIG. 3 is a timing chart illustrating a method of driving the light-emitting unit in FIG. 2.

Referring to FIGS. 1 to 3, one frame FRAME is divided into four periods F1, F2, F3 and F4.

Generally, the liquid crystal of LCD panel 140 varies the transmittance of the light in response to the data voltage applied to the data lines DL. The light-transmittance response waveform RP of the liquid crystal may gradually increase throughout the driving time until the ending of the driving time.

Accordingly, as the first gate line to the last gate line of LCD panel 140 are sequentially driven, the light-transmittance response waveforms RP of the liquid crystal corresponding to the first gate line to the last gate line may be sequentially delayed by a constant time.

Figure 4:
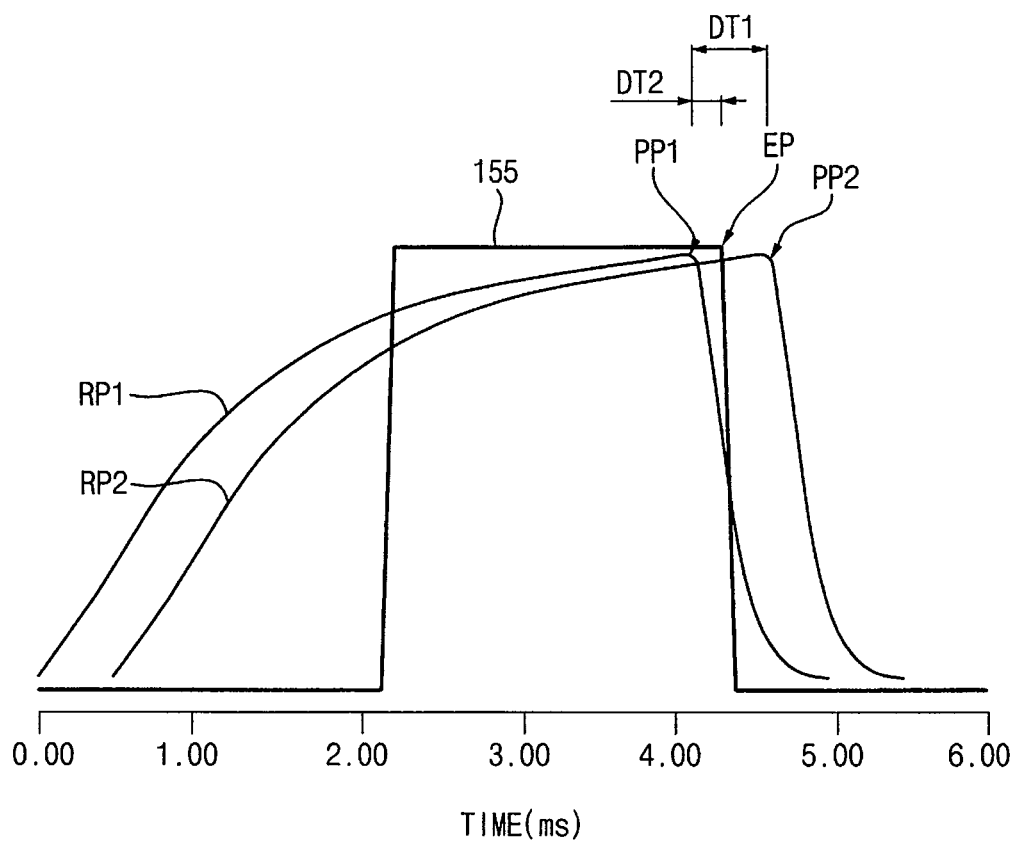
FIG. 4 is a timing chart showing a light-emitting interval of the light-emitting unit in FIG. 3.

In FIG. 3, the light-transmittance response waveform RP of the liquid crystal corresponding to a first gate line of the gate lines, for example, is roughly shown. However, as the first gate line to the last gate line of LCD panel 140 are sequentially driven, the light-transmittance response waveforms RP corresponding to the first gate line to the last gate line may be sequentially delayed by a constant time as shown in FIG. 4.

In order to improve light transmittance, the light-emitting units 152 are driven to be synchronized with the light-transmittance response waveform RP of the liquid crystal. For example, the turn-on times of the light-emitting units 152 are sequentially delayed as much as the light-transmittance response waveform RP of the liquid crystal is delayed from the first light-emitting unit B1 to the eighth light-emitting unit B8.

The first light-emitting unit B1 generates lights having different colors in corresponding periods F1, F2, F3 and F4 during a constant light-emitting interval. Particularly, the first light-emitting unit B1 generates red light RL in the first period F1, generates green light GL in the second period F2, generates blue light BL in the third period F3, and generates white light WL in the fourth period F4. Alternatively, the light-emitting order of red light RL, green light GL, blue light BL and white light WL may change variously.

The second to eighth light-emitting units B2 to B8 start to emit the light such that a turn-on time of the second to eighth light-emitting units B2 to B8 are sequentially delayed by a constant time in comparison with a light-emitting starting time of the first light-emitting unit B1. For example, when the time interval of each period F1, F2, F3 and F4 is T1, the light-emitting units 152 of the first light-emitting unit B1 to the eighth light-emitting unit B8 sequentially emit light at times delayed by one eighth of T1.

For example, when LCD apparatus 100 is driven in 60 Hertz, one frame FRAME is about 16.7 ms and the first period F1, the second period F2, the third period F3 and the fourth period F4 are about 4.2 ms. Then, the second and eighth light-emitting units B2 to B8 sequentially emit light in times delayed by about 0.35 ms in comparison with the previous light-emitting unit.

FIG. 4 is a timing chart illustrating a light-emitting interval of the light-emitting unit in FIG. 3. In FIG. 4, 'RP1' represents the light-transmittance response waveform of the liquid crystal corresponding to the first gate line, and 'RP2' represents the light-transmittance response waveform of the liquid crystal corresponding to the last gate line.

Referring to FIGS. 3 and 4, the first gate line to the last gate line are sequentially driven, and the light-transmittance response waveforms RP of the liquid crystal corresponding to the first gate line to the last gate line may be sequentially delayed by a constant time.

A first delay time DT1 between the light-transmittance response waveform RP1 and the light-transmittance response waveform RP2 may be determined by the number of the period and the number of the light-emitting unit. For example, when one frame FRAME is divided into the four periods F1, F2, F3 and F4 and the eight light-emitting units are disposed, the first delay time DT1 is about 0.52 ms, which is a value of about 4.2 ms (a time of one frame) divided by eight (the number of the light-emitting units).

Also, the light-transmittance response waveform RP of the liquid crystal may gradually increase from an initial driving time to an end of the driving time during the liquid crystal is driven. Therefore, the light-transmittance response waveform has a peak waveform (PP) at the end of the driving time.

For example, the light-transmittance response waveform RP1 may have a first peak PP1 delayed by about 4.2 ms from the initial driving time. The light-transmittance response waveform RP2 may have a second peak PP2 delayed by about 0.52 ms from the first peak PP1. The first peak PP1 corresponds to a maximum light-transmitting time point in a region of LCD panel 140 corresponding to the first gate line. The second peak PP2 corresponds to a maximum light-transmitting time point of a region of LCD panel 140 corresponding to the last gate line.

When the liquid crystal is sequentially driven according to the first light-transmittance response waveform RP1 corresponding to the first gate line through the second light-transmittance response waveform RP2 corresponding to the last gate line, the amount of light passing through the liquid crystal may be proportional to an integral value of each light-transmittance response waveform RP multiplied by a light-emitting signal of the light-emitting unit 152. An integral interval of the integral value is a light-emitting interval 155 of the light-emitting unit 152, and each of the light-transmittance response waveforms and the light-emitting signal is a function of time. As mentioned above, the light-transmittance response waveforms of the liquid crystals respectively corresponding to from the first gate line to the last gate line sequentially delay and shift to a plus direction of an axis of the time. Therefore, the light-emitting interval 155 is adjusted so that a sum of integral values calculated by integrating light-transmittance response waveforms of liquid crystals respectively corresponding to from the first gate line to the last gate line multiplied by the light-emitting signal of the light-emitting unit 152 for the integral interval of the light-emitting interval 155 is maximized. Accordingly, efficiency of the light of LCD apparatus 100 is maximized.

For example, a light-emitting ending point EP of the light-emitting interval 155 may be determined to be disposed between the first peak PP1 and the second peak PP2. The first peak PP1 corresponds to the maximum light-transmitting time point of a region of LCD panel 140 corresponding to the first gate line, and the second peak PP2 corresponds to the maximum light-transmitting time point of a region of LCD panel 140 corresponding to the last gate line. In other words, the light-emitting unit 152 is driven so that the light-emitting ending point EP is delayed from the first peak PP1 of the light-transmittance response waveform RP1 by a second delay time DT2 that is smaller than the first delay time DT1.

As mentioned above, the suitable light-emitting starting point and light-emitting ending point EP of the light-emitting interval 155 may be calculated by integrating each light-transmittance response waveform RP multiplied by the light-emitting signal of the light-emitting unit 152 for the integral interval of the light-emitting interval 155. That is, the light-emitting starting point and the light-emitting ending point EP of the light-emitting interval 155 may be determined so that a sum of the integral values respectively calculated by integrating light-transmittance response waveforms of liquid crystals corresponding to the first gate line to the last gate line which drive the liquid crystals, respectively, multiplied by the light-emitting signal of the light-emitting unit for the integral interval of the light-emitting interval 155 is maximized.

Table 1 shows luminance-gain corresponding to changes of the second delay time DT2, which is a time interval between the first peak PP1 and the light-emitting ending point EP of the light-emitting interval 155.

TABLE 1

| Second delay time (ms) | Luminance-gain (%) |
|---|---|
| 0.00 | 0.000 |
| 0.08 | 0.567 |
| 0.16 | 0.835 |
| 0.24 | 0.689 |
| 0.32 | 0.052 |
| 0.40 | −1.126 |

In Table 1, luminance-gain may be obtained by the following Equation 1.

$$\text{LUMINANCE-GAIN} = \frac{La - Lb}{Lb} \times 100, \quad \text{Equation 1}$$

wherein 'La' represents luminance after improvement, and 'Lb' represents luminance before improvement. Particularly, 'La' or 'luminance after improvement' represents a luminance when the first peak PP1 of the light-transmittance response waveform RP1 coincides with the light-emitting ending point EP of the light-emitting interval 155 or the second delay time DT2 is 0 ms. 'Lb' or 'luminance before improvement' represents a luminance when the second delay time DT2 is not zero.

Referring to Table 1, when the luminance-gain is correspondingly calculated to the second delay time DT2 that is the time interval between the first peak PP1 and the light-emitting ending point EP, the luminance-gain increases and then decreases as the second delay time DT2 increases. For example, when the second delay time is about 0.16 ms, the maximum luminance-gain is about 0.835%.

Thus, when the light-emitting unit 152 is driven so that the second delay time DT2 is in a range of about 0.15 ms to about 0.17 ms, luminance enhancement of the LCD apparatus is maximized.

The optimized timing of the second delay time DT2 may be correspondingly changed to the number of the periods.

Figure 5:
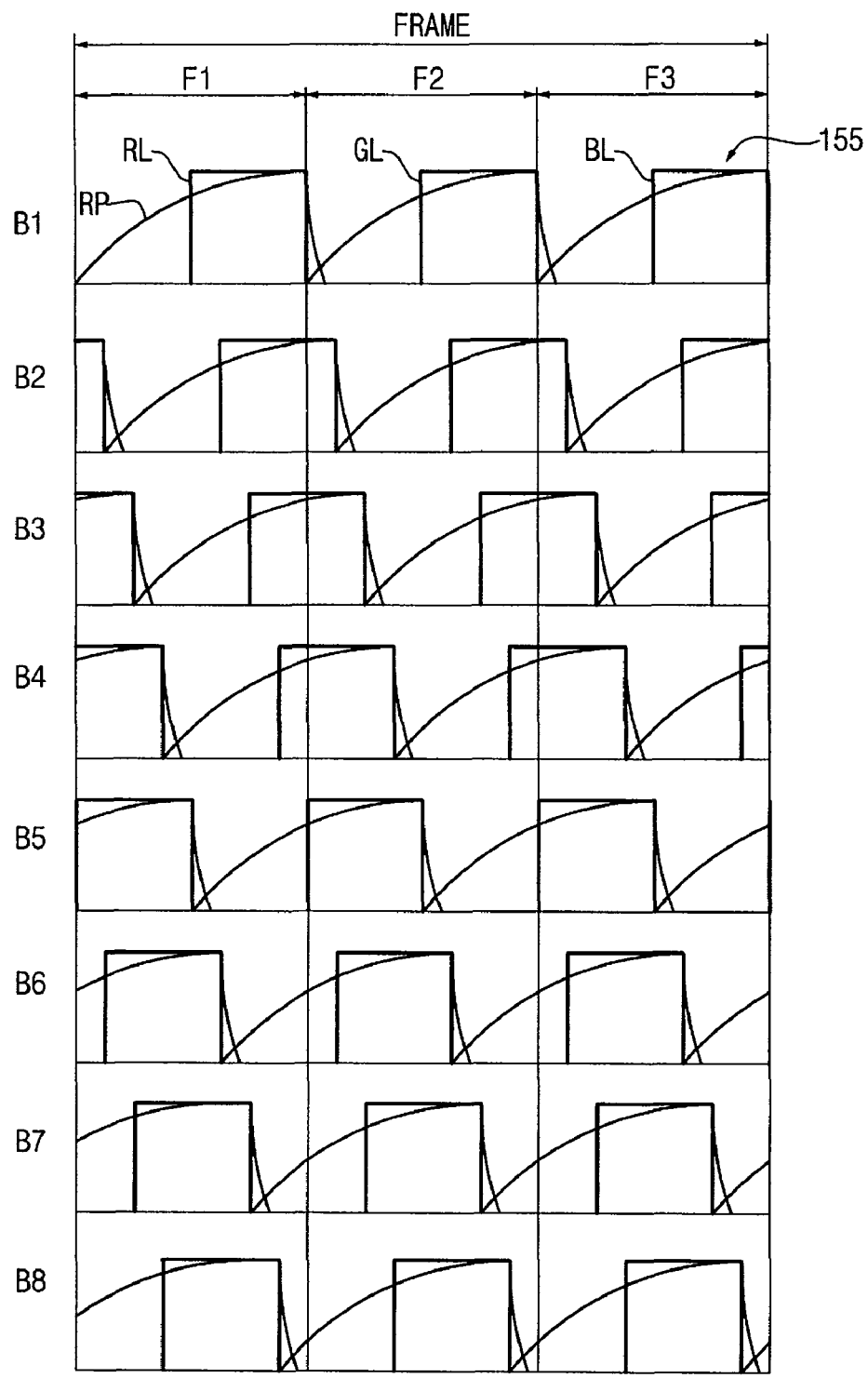
FIG. 5 is a timing chart showing a method of driving a light-emitting unit in accordance with another exemplary embodiment of the present invention.

FIG. 5 is a timing chart illustrating a method of driving a light-emitting unit in accordance with another exemplary embodiment of the present invention.

Referring to FIGS. 1, 2 and 5, one frame FRAME of LCD apparatus 100 is divided into three periods F1, F2 and F3. The light-emitting units 152 generate lights having different colors corresponding to each period F1, F2 and F3. For example, the light-emitting units 152 generate red light RL in the first period F1, generate green light GL in the second period F2, and generate blue light BL in the third period F3. However, the light-emitting order of the red light RL, the green light GL and the blue light BL may change variously.

The light-emitting unit 152 may be substantially the same as the light-emitting unit 152 in FIG. 4, except for the number of periods in the frame. Therefore, the light-emitting unit 152 is driven so that the light-emitting ending point EP of the light-emitting interval 155 is delayed by a second delay time DT2 from the first peak PP1 of the light-transmittance response waveform RP1 corresponding to the first gate line. The second delay time DT2 is smaller than the first delay time DT1.

For example, when LCD apparatus 100 is driven in 60 Hertz, one frame FRAME is about 16.7 ms and the first period F1, the second period F2 and the third period F3 are about 5.6 ms, respectively. When one frame FRAME is divided into the three periods F1, F2 and F3 and the eight light-emitting units 152 are disposed under LCD panel 140, the first delay time DT1 is about 0.7 ms, which is a value of about 5.6 ms of one period divided by eight which is the number of the light-emitting units 152. Then, the optimized light-emitting ending point EP of the light-emitting interval 155 may be calculated by the above Equation 1.

When the number of the periods may be variously changed, the optimized driving time of the light-emitting unit may be adjusted by the above methods of the present invention, so that luminance of the LCD apparatus is improved.

According to the present invention, the timing between the light-transmittance response waveform of the liquid crystal and the light-emitting interval of the light-emitting unit is optimized, so that luminance of the LCD apparatus is improved.

This invention has been described with reference to the example embodiments. It is evident, however, that many alternative modifications and variations will be apparent to those having skill in the art and may be made without, however, departing from the spirit and scope of the invention.

What is claimed is:

1. A liquid crystal display (LCD) apparatus comprising:
   an LCD panel including a plurality of gate lines and a plurality of data lines crossing a plurality of the gate lines; and
   a plurality of light-emitting units each respectively generating lights in a light-emitting interval to illuminate a part of the LCD panel,
   wherein a light-emitting ending point of the light-emitting interval is disposed between a first maximum light-transmitting time of a first region of the part of the LCD panel and a second maximum light-transmitting time of a second region of the part of the LCD panel, the first region corresponding to the first gate line of the plurality of gate lines belonging to the part of the LCD panel illuminated by the light-emitting unit and the second region corresponding to the last gate line of the plurality of gate lines.

2. The LCD apparatus of claim 1, wherein the LCD panel comprising:
   a first substrate including the gate lines and the data lines;
   a second substrate facing the first substrate; and
   a liquid crystal disposed between the first and second substrates, the liquid crystal adjusting light-transmittance of light provided from the light-emitting units.

3. The LCD apparatus of claim 2, wherein the liquid crystal is driven by a potential difference between voltages applied to the first substrate and the second substrate and has a light-transmittance response waveform gradually increasing from an initial driving time to an ending driving time.

4. The LCD apparatus of claim 3, wherein the light-transmittance response waveform of the liquid crystal is sequentially delayed from the first gate line to the last gate line by a constant time.

5. The LCD apparatus of claim 4, wherein the light-transmittance response waveform corresponding to the first gate line has a first peak in the first maximum light-transmitting time and the light-transmittance response waveform corresponding to the last gate line has a second peak in the second maximum light-transmitting time.

6. The LCD apparatus of claim 5, wherein each of the light-emitting unit sequentially generates different colored light in each of the corresponding light-emitting intervals.

7. The LCD apparatus of claim 6, wherein the light-emitting ending point of the light-emitting interval is delayed from the first maximum light-transmitting time by about 0.15 ms to about 0.17 ms.

8. The LCD apparatus of claim 7, wherein a delay time between the first maximum light-transmitting time and the second maximum light-transmitting time is in a range of about 0.52 ms to about 0.53 ms.

9. The LCD apparatus of claim 8, wherein eight light-emitting units are disposed such that a longitudinal direction of the light-emitting units is substantially parallel to the gate lines.

10. The LCD apparatus of claim 5, wherein each of the light-emitting units sequentially generates at least red light, green light and blue light in each of the corresponding light-emitting intervals, respectively.

11. The LCD apparatus of claim 5, wherein each of the light-emitting units includes a red light-emitting diode, a green light-emitting diode and a blue light-emitting diode.

12. A method of driving an LCD apparatus having a plurality of light-emitting units,
    wherein each of the light-emitting units generates lights in a corresponding light-emitting interval to illuminate a part of an LCD panel corresponding to a particular light-emitting unit, and a light-emitting ending point of the light-emitting interval is disposed between a first maximum light-transmitting time of a first region of the part of the LCD panel and a second maximum light-transmitting time of a second region of the part of the LCD panel, the first region corresponding to a first gate line of a plurality of gate lines belonging to the part of the LCD panel illuminated by the particular light-emitting unit, and the second region corresponding to a last gate line of the plurality of gate lines.

13. The method of claim 12, wherein each of the light-emitting unit generates red light, green light and blue light in each corresponding light-emitting interval.

14. The method of claim 13, wherein the light-emitting units are disposed such that a longitudinal direction of the light-emitting units are substantially parallel to the gate lines, and the light-emitting units are driven so that the light-emitting ending point of each of the light-emitting intervals is delayed from the first maximum light-transmitting time by about 0.15 ms to about 0.17 ms.

15. The method of claim 12, wherein each of the light-emitting units sequentially generates red light, green light and blue light in each corresponding light-emitting interval.

16. The method of claim 12 wherein the light-emitting interval is determined so that an integral value of light-transmittance response waveforms multiplied by light-emitting signals of light-emitting unit is maximized.

17. A method of driving an LCD apparatus having a plurality of light-emitting units,
    wherein each of the light-emitting units generates light in a corresponding light-emitting interval to illuminate a part of a LCD panel corresponding to the light-emitting unit, wherein a starting point and an ending point of the light-emitting interval is set up so that a sum of integral values calculated by integrating light-transmittance response waveforms respectively corresponding from a first gate line of a plurality of gate lines to a last gate line of the plurality of gate lines of the part of the LCD panel multiplied by a light-emitting signal waveform for an integration interval of the light-emitting interval.

18. The method of claim 17, wherein the ending point of the light-emitting interval is disposed between a first peak of the light-transmittance response waveform corresponding to the first gate line of plurality of gate lines belonging to the part of the LCD panel corresponding to the light-emitting unit and a second peak of the light-transmittance response waveform corresponding to the last gate line of the plurality of gate lines.

19. The method of claim 18, wherein the light-emitting units are driven so that the light-emitting ending point of the light-emitting interval is delayed from the first maximum light-transmitting time by a delay time in a range of about 0.15 ms to about 0.17 ms.

* * * * *